July 4, 1967

E. C. UHRENHOLDT 3,329,592

METHOD OF AND APPARATUS FOR CONTROLLING ALUMINUM REDUCTION POTS

Filed Aug. 30, 1963

INVENTOR

EUGENE C. UHRENHOLDT

BY *Glenn, Palmer and Matthews*

ATTORNEYS

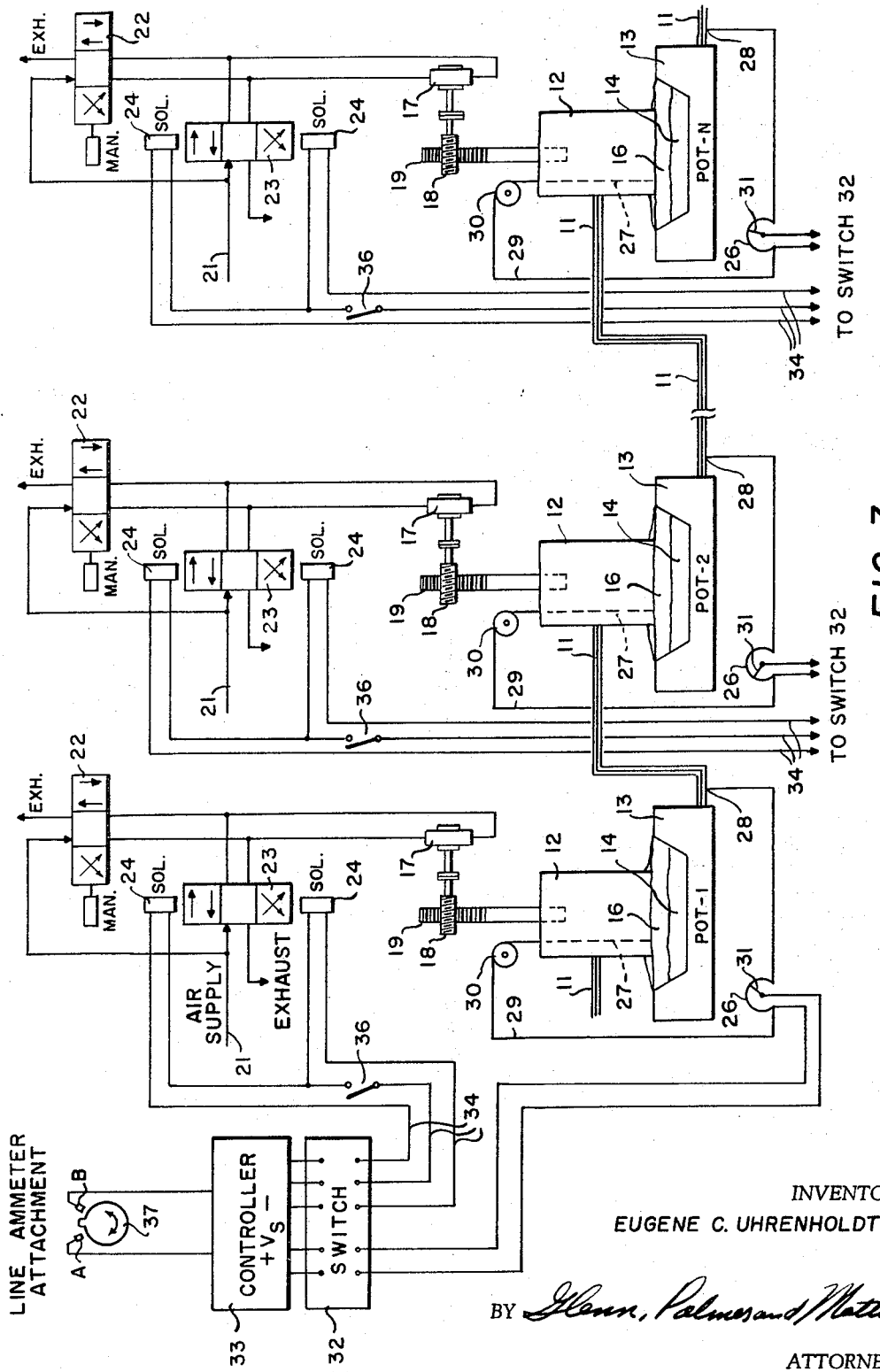

INVENTOR
EUGENE C. UHRENHOLDT
BY
Glenn, Palmer and Matthews ATTORNEYS

United States Patent Office 3,329,592
Patented July 4, 1967

3,329,592
METHOD OF AND APPARATUS FOR CONTROLLING ALUMINUM REDUCTION POTS
Eugene C. Uhrenholdt, Aransas Pass, Tex., assignor to Reynolds Metals Company, Richmond, Va., a corporation of Delaware
Filed Aug. 30, 1963, Ser. No. 305,597
22 Claims. (Cl. 204—67)

This invention relates to a method of and apparatus for controlling reduction pots, and more particularly to a method of and apparatus for automatically controlling the working voltage of aluminum reduction pots in the process of electrolytic production of aluminum.

In the conventional electrolysis of alumina dissolved in a molten salt electrolyte such as cryolite the alumina is broken down in a cell or pot having an anode and cathode and deposited as molten aluminum at the cathode by passing a very large current of thousands of amperes between the anode and cathode. Typically, the total pot voltage is in the order of 4.5–5 volts while the working voltage $V_W$ (voltage between anode face and cathode) is in the order of 3.5–4 volts. The working voltage $V_W$ is subject to variation due to changes within the pot such as variation in alumina concentration, resistance, line current, and other factors. A stable pot working voltage $V_W$ is essential in order to maintain a substantially constant thermal balance of the pot and it is recognized that over certain periods of time a constant pot working voltage is essential for efficient and economical pot operation.

The problem of controlling reduction pot working voltage in producing aluminum has long been of great concern in the industry and generally is achieved by varying the distance between the anode and cathode of the aluminum reduction pot in order to compensate for fluctuations in the pot working voltage. However, this control function has in the past been effected manually by a skilled operator and, of course, subject to human limitations. Although voltage comparison techniques where the pot working voltage is compared with a standard voltage and the anode adjusted relative to the cathode in order to seek a null balance are known, this method of control is in many ways more harmful than helpful because of the continuous cycling or hunting in such systems. Due to the numerous factors that may continuously induce or cause minor fluctuations in the pot working voltage, the present voltage comparison anode positioner systems are in constant operation resulting in continuous cycling and anode adjustment and in many cases completely upsetting the thermal balance of the pot.

Further, known voltage comparison systems for maintaining a stable pot working voltage cannot be adapted to automatically control a large number of reduction cells or pots as the resulting complex circuitry and apparatus is not only prohibitive costwise, but is also highly inaccurate and does not provide the necessary control required for automatically regulating a number of pots.

A principal reason why known voltage comparison systems have not been arranged to control a plurality of cells is that each reduction pot may have a different optimum working voltage due to its particular anode and cathode resistance, ledge formations, and other individual characteristics, and until now it has not been known in the industry how to automatically maintain a series of different pots at their respective optimum working voltage using a comparison and balancing technique. For that matter, it is extremely difficult to maintain accurate control of one reduction cell using known voltage comparison balancing techniques because of the manner in which the working voltage is measured and compared with a standard voltage.

Accordingly, an object of this invention is to provide a method of and apparatus for producing a reference voltage proportional to the optimum working voltage of an aluminum reduction pot.

Still another object of this invention is to provide a method of and apparatus for controlling the working voltage of an aluminum reduction pot by adjusting the anode-cathode distance of said pot in response to variations in said working voltage wherein a reference voltage proportional to said working voltage is compared with a standard voltage and any difference voltage therebetween utilized to vary said anode-cathode distance.

A further object of this invention is to provide a method of and apparatus for controlling the working voltage of a plurality of reduction pots each having an anode and a cathode wherein reference voltages proportional to the optimum working voltage for each pot and each reference voltage being equal to or within predetermined limits of a single standard voltage are compared with said single standard voltage in seriation and any difference signal between said reference and standard signals is employed to vary the anode-cathode distance of each of said pots, respectively.

Another object of this invention is to provide a method of and apparatus for controlling the working voltage of a plurality of aluminum reduction pots wherein a plurality of reference signals, one for each reduction pot, are generated and sequentially compared for determined intervals with a single standard signal, and wherein a control function is initiated only when the difference signal between said respective reference and standard signals exceeds a predetermined minimum amount and wherein said sequential comparisons are interrupted when said difference signal exceeds a determined maximum.

An additional object is to achieve a type of reduction pot control providing a substantially constant heat input into a pot, thereby improving the heat balance and control of the pot.

These and many other objects may be obtained by practicing the method in accordance with this invention which in general may include the step of first producing a reference signal ($V_R$) proportional to a predetermined optimum value of the pot working voltage ($V_W$), and initially equal to a standard signal $V_S$ at the time a null balance is obtained.

As the pot working voltage $V_W$ and the corresponding reference signal $V_R$ vary and the difference signal ($V_R - V_S = V_D$) exceeds a minimum value, the anode-cathode distance is adjusted until the difference signal $V_D$ is again within the determined control range.

When controlling the working voltage $V_W$ of a plurality of reduction pots, a plurality of reference signals $V_R$ are provided as in the case of controlling a single reduction pot. Although the optimum working voltage $V_W$ for each reduction pot may be different, by producing a reference signal $V_R$ proportional to the respective working voltage $V_W$, all reference signals $V_R$ are brought within specified limits of a predetermined value and thus only a single standard signal $V_S$ is required.

The reference signal $V_R$ from each reduction pot is sequentially compared with the standard signal $V_S$ providing a difference signal $V_D$. When the difference signal $V_D$ exceeds the control range value the anode-cathode distance for the respective reduction pot is adjusted until $V_D$ is again within the control range. If $V_D$ exceeds a maximum value, the sequential comparison steps are interrupted and control action is effected. If no control action is effected within a determined interval upon first comparison, the next reference signal is compared to the standard signal, and so on in sequence. If control action is effected and not completed within a determined interval which is variable up to a maximum time period, the next comparison is made.

Apparatus in accordance with the invention for accomplishing the aforementioned and many other objects may include a conventional reduction pot and a suitable source of current for effecting electrolytic reduction; circuit means providing a standard signal $V_S$; and means for impressing the working voltage $V_W$ (between a relatively adjustable anode and cathode of a reduction cell) across a variable impedance. Scanning means are provided for sequentially comparing a portion $V_R$ of the voltage $V_W$ across each variable resistance, $V_R$ being proportional to said working voltage $V_W$, with the standard signal $V_S$ to produce a difference signal $V_D$ proportional to variations in said working voltage $V_W$.

Means responsive to said difference signal $V_D$, adjust said anode-cathode distance to maintain the difference signal $V_D$ within a determined control range.

Timing means control each comparison step providing a minimum delay time whereby the scanning means proceeds to the next reference signal $V_R$ if no control action is effected. However, if control action is effected but not completed during the minimum time interval, the control period is repeated until the control action is completed and the difference signal ($V_D$) brought within the control range. The scanning means are also provided with manual and reset control features.

Although the invention has been described as relating to the control of aluminum reduction pots, it is not intended to be limited thereto as the invention may be used in other instances where it is desired to compare and balance a variable signal with a standard signal, particularly where it is desirable to compare and balance a series of variable signals with a single standard signal.

The noted objects and advantages of the invention as well as numerous others will become apparent from the following detailed description when read in view of the appended drawings wherein:

FIGURE 3 is a schematic diagram illustrating the invention as used for the control of a plurality of aluminum reduction pots;

A primary object of the invention is to automatically control the working voltage $V_W$ of one or more aluminum reduction pots. Whether pot control is manual or automatic, the problems involved are formidable and involve a large number of variables such as pot adjustment, breaking of crust, tapping of molten aluminum, the addition of alumina, bath materials and other operations.

A constant goal is maximum production of aluminum at minimum cost. Experience indicates a governing factor of efficient pot operation is thermal balance, which requires control of the power input to the pot. As the line current remains essentially constant, variation in the pot working voltage $V_W$ is a critical factor. This is clearly illustrated by FIGURES 1a–1e which show various operational curves of an unregulated pot having a variable pot working voltage ($V_W$) and a regulated pot (FIGURES 2a–2e) having a substantially constant pot voltage ($V_W$).

FIGURES 2a–2e clearly show how little the heat input to the regulated pot varies when the pot working voltage $V_W$ is maintained substantially constant by varying the anode-cathode distance to offset the decrease in alumina concentration. Compare this with the large increase in heat input in the unregulated pot as shown in FIGURES 1a–1e, and again caused by variations in alumina concentration.

Figure 1D:
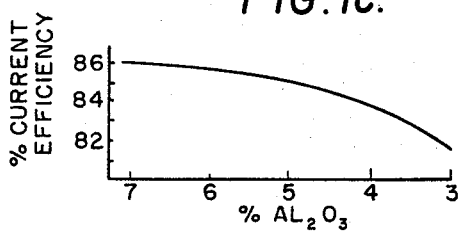
Figure 2D:
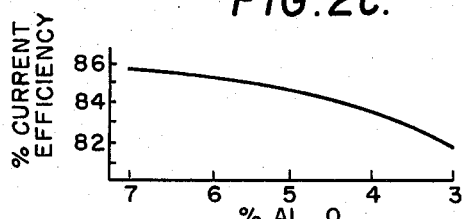
Figure 1E:
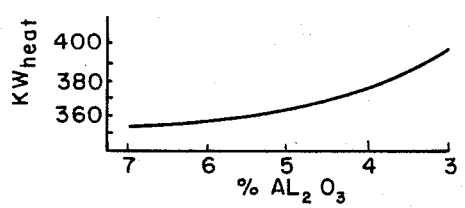
Figure 2E:
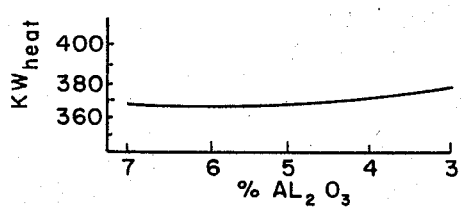

The net effect of decreasing alumina concentration is to increase the pot voltage ($V_W$) as long as the anode-cathode distance remains constant. As the power (KW) input increases, the pot heats up and current efficiency decreases as shown in FIGURE 1d. As less power is used to make aluminum, the remainder is converted to heat, causing the rise in heat input to the pot, FIGURE 1e.

Figure 1A:
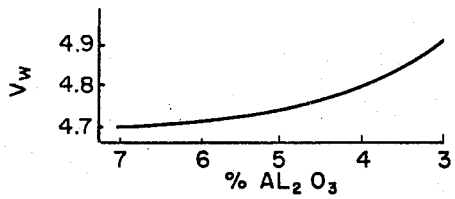
FIGURES 1a–1e illustrate curves of various variable parameters of an aluminum reduction pot as they vary with the percent of dissolved alumina in the bath as the abscissa and in which variation of pot working voltage $V_W$ is permitted.
Figure 2A:
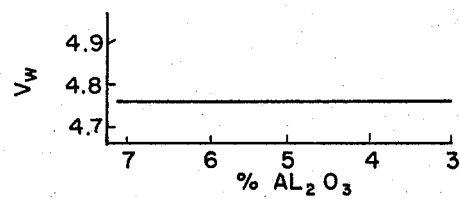
FIGURES 2a–2e illustrate curves of the same variable parameters of an aluminum reduction pot as shown in FIGURE 1 in which the pot working voltage $V_W$ is regulated and maintained substantially constant.
Figure 1B:
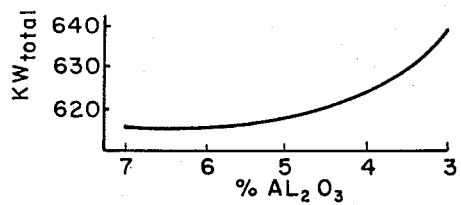
Figure 2B:
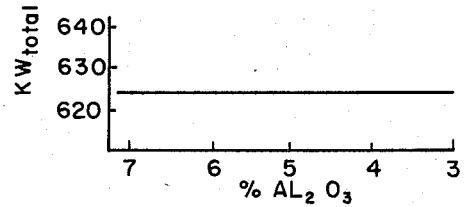
Figure 1C:
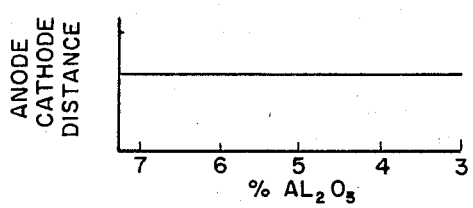
Figure 2C:
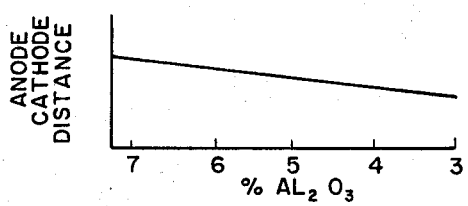

However, as shown in FIGURES 2a–2e, the power input (KW) remains substantially constant with a constant pot voltage ($V_W$) maintained by shortening the anode-cathode distance (FIGURE 2c). Although current efficiency decreases (FIGURE 2d) as the anode-cathode distance decreases (FIGURE 2c), the heat input (FIGURE 2e) rises only slightly since there is less total KW input to the pot (FIGURE 2b).

The data for the curves shown in FIGURES 1 and 2 are computed as follows:

Curve a.—Pot volts ($V_W$) vs. percent $Al_2O_3$ (1) $$V_w = I \times \frac{L}{A_b C} + E_d + E_o$$

where $L = a-c =$ anode-cathode distance
$C =$ bath conductivity
$A_b =$ bath area
$E_d =$ reversible decomposition voltage
$E_o =$ anode over voltage Curve b.—Pot KW vs. percent $Al_2O_3$ (2) $$KW = I(V_W) = 132{,}000 \, V_W$$

Curve c.—Experimental results
Curve d.—Percent current efficiency vs. percent $Al_2O_3$
Estimated from an equation of the form:

(3) $$CE = A' + B'L + C'(KW)$$

where $A'$, $B'$, and $C'$ are constants.

This equation approximates the following:

$$CE = A' + B'L^{c'} + D'(KW)$$

Curve e.—Heating vs. percent $Al_2O_3$ (4) $$KW_{heat} = KW_{total} - KW_{al}$$

where $KW_{al} =$ power to make aluminum from:

$$KW_{al} = IV_{al} = I[0.508 + 1.645(CE)]$$

computed from the stoichiometry and thermodynamics of the reaction.

Referring to Equation 1 it can be seen that as bath alumina concentration decreases, $V_W$ increases assuming the anode-cathode distance $a$–$c$ remains constant as well as the remaining factors $E_d$ and $E_o$.

In order to maintain a substantially constant voltage $V_W$ with a decreasing bath alumina concentration then $a$–$c$ is decreased. With an increasing bath alumina concentration $a$–$c$ is increased. In both instances regulation of $V_W$ is achieved by assuming that $E_d$, $E_o$, line current, polarized cell potential and cathode voltage drop are substantially constant.

As shown from the foregoing discussion of FIGURES 1a–1e and 2a–2e, control of the pot working voltage $V_W$ is essential in order to maintain a proper thermal balance in the pot and for efficient pot operation.

Referring now to FIGURE 3, a system for automatically controlling the pot working voltage $V_W$ of one or more aluminum reduction pots in accordance with the invention is schematically illustrated. A series of aluminum reduction pots 1, 2, n, of conventional construction, are connected in series with a suitable power line 11. Each pot includes a vertically adjustable anode 12, of either the self-baked (Soderberg) type or the pre-baked type, a cathode 13, a layer of molten aluminum 14, and bath components 16.

Each adjustable anode 12 is raised up and down by means of a reversible air motor 17 that turns a screw 18 to reciprocate a jack system 19 secured to the adjustable anode 12. The reversible air motors 17 are similarly connected to a suitable source of air pressure 21 by way of both a manual four-way air valve 22 and a four-way, three-position air valve 23, operated by solenoids 24.

A variable resistance 26 is connected to an anode probe 27 and cathode bus 28 by means of a conductor 29 supported on a suitable reel 30.

The voltage across the variable resistance 26 is in parallel with and substantially the same as the working voltage $V_W$ of the pot where $$V_W = \frac{IL}{A_b C} + E_o + E_d$$

(Equation 1) as previously stated. A center tap 31 is adjusted to provide a voltage $V_R$ of desired value and proportional to the working voltage ($V_W$) of the pot.

A multiple position, impulse actuated scanning switch 32 sequentially connects each variable resistance 26 and resulting signal $V_R$ to a single controller 33 including a standard voltage source $V_S$ which is compared with $V_R$ of each pot 1–N. If the difference signal $V_D$ exceeds a determined control range, the controller 33 is arranged to pulse either of the solenoids 24 by way of conductors 34 to raise or lower the anode 12 until the pot reference voltage $V_R$ is within a determined tolerance of $V_S$. At this time, $V_D$ is again within the determined control range. A manual control switch 36 is provided for disconnecting both solenoids from the controller 33.

A line ammeter switch attachment 37 is arranged to measure the current in line 11 and disconnect the controller 33 if the line current varies more than a determined amount from a normal operating level. In this instance a 1,000 ampere line current fluctuation operates the attachment 37 to disconnect the controller 33 and automatic scanning is discontinued until the line current is again normal.

In operation, the switch 36 for each pot 1–N is opened and the respective anode 12 adjusted until the pot 1–N is operating at its optimum condition at which time there is a voltage drop $V_W$ across the variable resistor 26. The variable resistor 26 is adjusted until a reference voltage $V_R$ equal to a standard voltage $V_S$ is available across the center tap 31 and one terminal of the variable resistor. The switch 36 is then closed and the pot is on line prepared for automatic voltage control. Each pot 1–N is similarly adjusted and the reference voltage $V_R$ from each variable resistor is made equal to the standard voltage $V_S$.

Since the reference voltages $V_R$ are all within determined limits of being equal, as well as being respectively proportional to the working voltage $V_W$ of each pot, this method of calibration compensates for any difference in $V_W$ for optimum conditions in each pot and also permits the use of a single standard voltage $V_S$ for comparison.

In the event that adjustment of the working voltage $V_W$ is required in order to maintain optimum operating conditions at a particular pot 1–N, the scanning switch 32 may be manually stepped to that pot position, switch 36 opened and manual adjustment of the anode-cathode distance effected as described. As adjustments are required infrequently, the working Voltage $V_W$ of the pots under control are checked periodically at scheduled intervals. Adjustments are made to keep each pot operating at its optimum operating condition.

With each pot 1–N calibrated and on line, scanning of all pots 1–N under control is performed continuously. As each pot is monitored or scanned, the reference voltage $V_R$ is compared with the standard $V_S$ and if $V_R$ deviates from the set point $V_S$ by a determined amount, the proper solenoid 24 is energized to raise or lower the anode 12 until $V_R$ is again within the control or dead band around the set point $V_S$. A 50 mv. dead band or control range may be employed so that $V_R$ is maintained within $\pm 25$ mv. of the set point $V_S$. The control or center dead band is adjustable. Timing means incorporated in the controller 33 delay control action momentarily to prevent continuous hunting or cycling that may be caused by brief fluctuations of $V_W$ and thus $V_R$ outside the control dead band.

In the event that $V_W$ varies more than a determined maximum amount, for instances 0.2 volt above its optimum value, due to an anode effect or other disturbance, switch means (FIGURE 5) cut out the controller 33 and prevent any future scanning of that particular pot until the voltage condition is relieved. The pot not operating normally may be removed from the line by opening the disconnect switch 36, and scanning of the remaining pots continues. A lower voltage limit of 1 volt, for instance, prevents the anode from being raised if a lesser voltage $V_W$ is interpreted to the controller by the scanning switch 32.

Timing means (FIGURE 5) establishes a minimum scan time of any determined value of say 3 seconds, so that unless a control action is commenced during this interval the scanning switch 32 steps to the next position. In the event a control action is started but not completed during the minimum scan interval, the scan period is automatically extended equal time periods (FIGURE 5) until the control action is completed. If $V_W$ and thus $V_R$ are not properly restored in an arbitrary maximum time interval of say 30 seconds, a signal is provided and the scanning switch steps to the next position. All time intervals are variable as desired and as necessary. Also, in order to prevent too frequent scanning cycles and repeated anode adjustment as where only one or but a few pots are to be controlled, a cycle timer may be provided so that scanning is completed at determined intervals.

Figure 4:
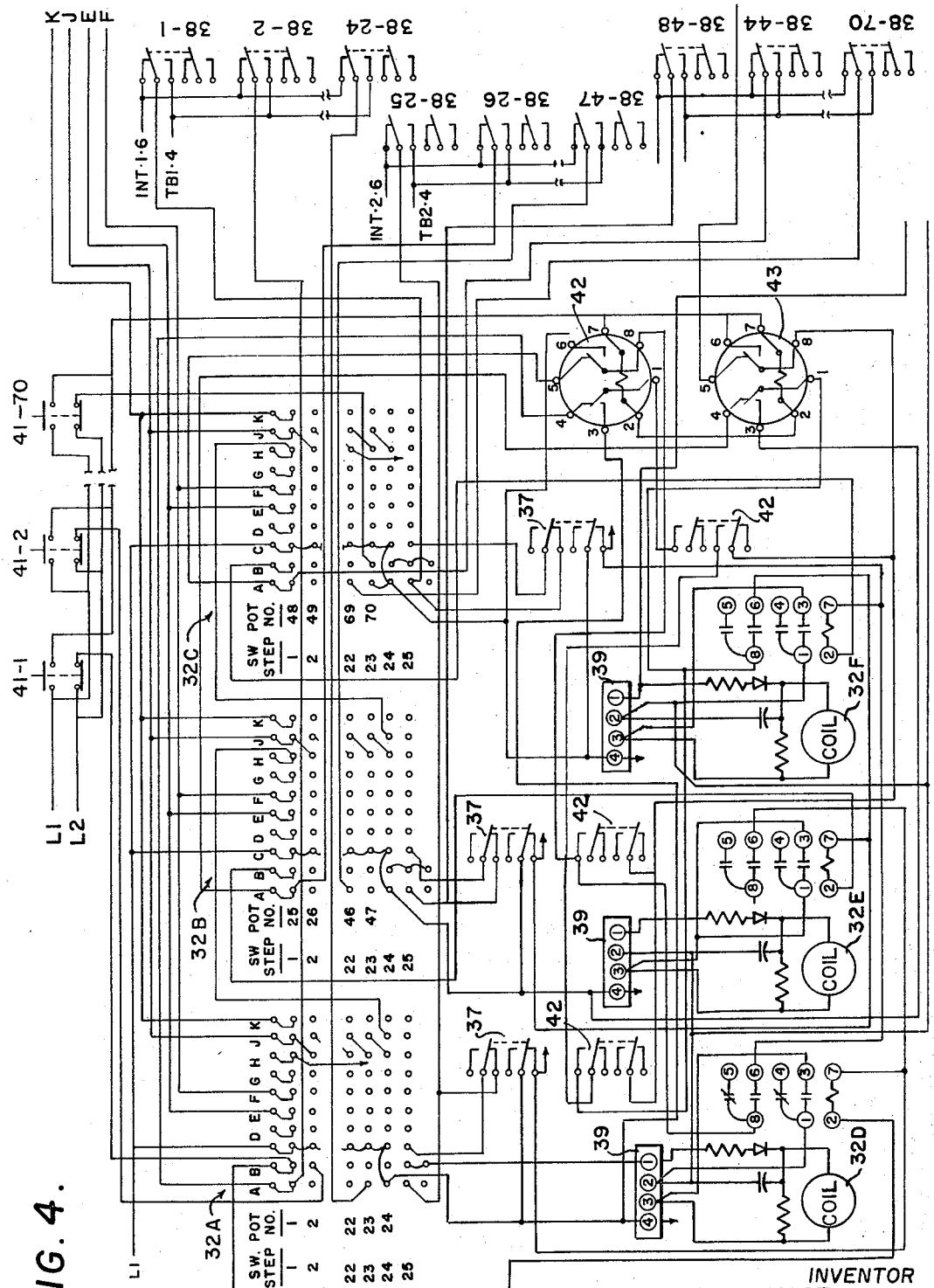
FIGURE 4 is an electrical schematic of a portion of the control circuit of the invention illustrating a plurality of interlocked stepping switches used to effect a scanning operation, in accordance with the invention.
Figure 5:
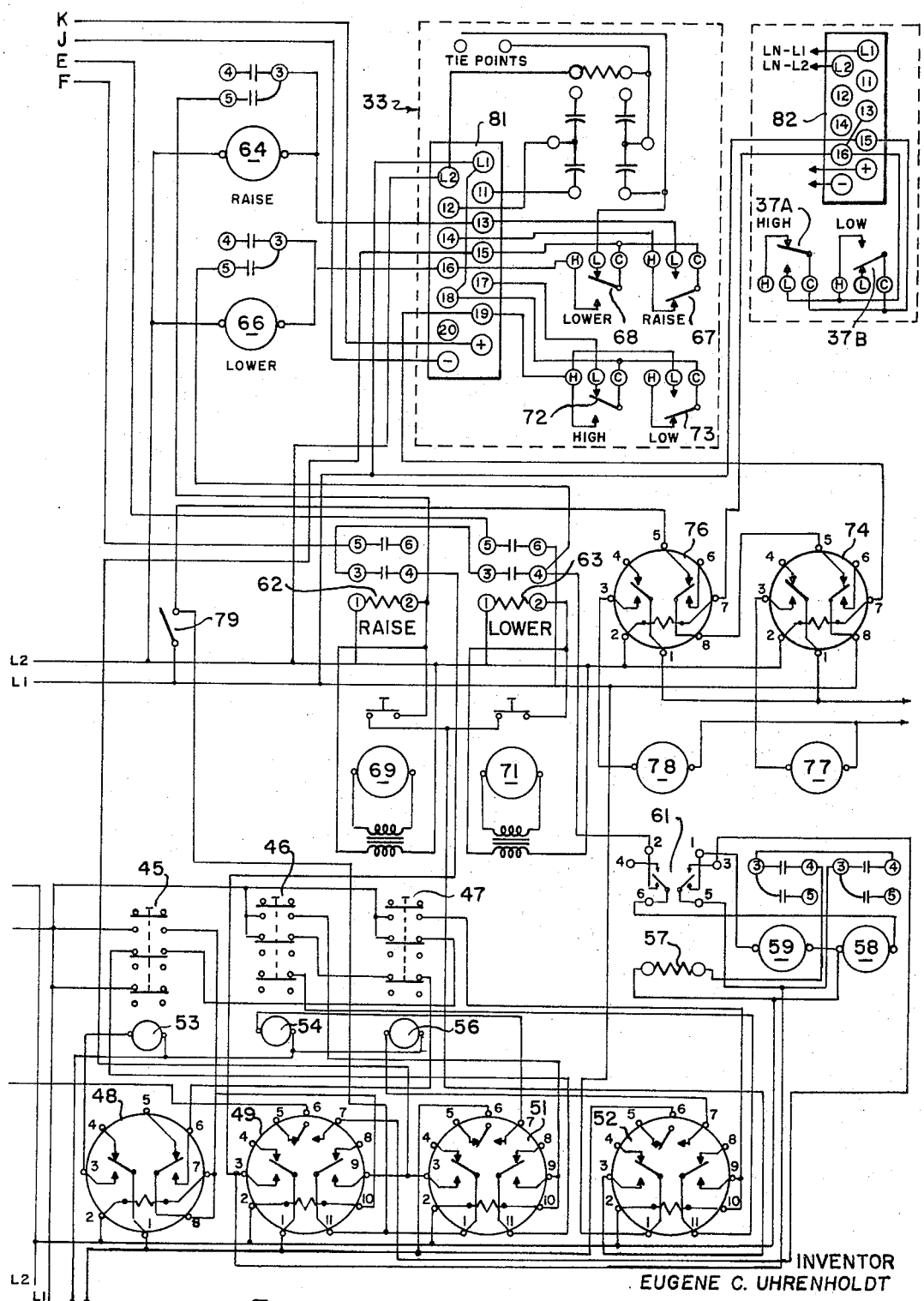
FIGURE 5 is an electrical schematic of a portion of the control circuit illustrating the controller or comparator and timing means shown in FIGURE 3 in greater details.

Referring now to FIGURES 4 and 5, a scanning switch and controller circuit for a seventy pot system in accordance with the principles of this invention are shown in detail. As shown in FIGURE 4, the scanning switch 32 comprises three, twenty-five position, ten contact, impulse actuated stepping switches 32A–32C, each of which includes a stepping coil 32D–32E, respectively. The three switches 32A–32C are commercially available and are arranged to automatically step over seventy pots. Although the circuit discloses a seventy pot system, the circuit may be adapted to control fewer or more pots as required by subtracting or adding scanning switches or by selecting a single switch having the desired number of positions. Each stepping switch position 1–25 includes contacts A–k, wired as shown, so that ten circuits are switched at each position.

Each stepping switch 32A–32C is provided with double pole double throw interrupter contacts 37 which are connected to one side of a two position console disconnect switch 38 provided for each pot and by way of suitable terminal blocks 39. With the disconnect switch 38–1 in the ON position, as shown, the scanning switch 32A functions normally and scans each step. With the switch 38–1 in the OFF position, the scanning switch 32A rapidly steps across the pots or positions 1–70 where the respective switches are OFF or open.

Homing switches 41–1 through 41–70 and double pole double throw switches 42 are provided to operate homing relays 43 and 44 and cause the scanning switches 32A, B and C to rapidly step to the switched position or pot corresponding to the homing switch closed. Thus any pot (1–70) can be recalibrated at any time by opening the corresponding console disconnect switch 38 and closing the homing switch corresponding to that pot number.

Figure 7:
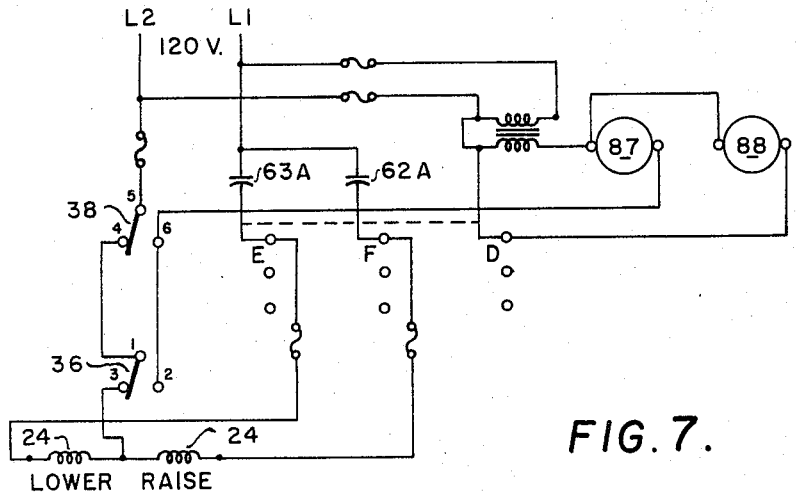
FIGURE 7 is an electrical schematic illustrating an anode raise and lower solenoid control circuit for an aluminum reduction pot.

Referring to FIGURE 5, the controller 33 includes a circuit for measuring $V_R$ and comparing it with $V_S$ (shown in detail in FIGURE 6) and suitable control circuitry for operating an anode raise-lower circuit shown in detail in FIGURE 7. Operational switches 45, 46, and 47, scan automatic relays 48, 49. No Scan Automatic Relay 51 and No Scan Manual Relay 52, permit automatic scan, or No Scan operation either automatically or manually. Signal lamps 53, 54 and 56 indicate the selected mode of operation.

During automatic scan operation, switch 45, actuated and signal lamp 53 on, coil actuated timer 57 is arbitrarily arranged to provide a .75 second time delay on each pulse of the scanning switch 32. The step-pulse duration may, of course, be varied. Timer motor 58 provides a three-second time delay at each switch step 1–70. Assuming no control action is effected at the end of three seconds, the scanning switch 32 is again pulsed and steps to the next position. If a control action is started and not completed within three seconds, timer motor 59 actuates switch 61 to repeat the contact duration until the control operation is completed. The timer motor 59 is arranged to provide a maximum time delay of 30 seconds before the scanning switch 32 steps to the next position.

Anode raise and lower control relays 62 and 63 respectively, are arranged to energize the solenoids 24 (FIGURE 7) when $V_R$ varies more than $\pm 25$ mv. from the set point $V_S$ for more than .5 second as determined by timer motors 64 and 66 and raise and lower switches 67 and 68, respectively. Raise and lower signal lamps 69 and 71 indicate in which direction control action is effected.

Switches 72 and 73 and voltage limit relay 74 are provided to lock out the controller 33 if $V_W$ varies greater than .2 volt above its optimum value. Current limit contacts 37B operate current relay 76 if the line current is higher or lower, respectively, than the normal line current. Voltage and current limit lamps 77 and 78 are turned ON when the relays 74 and 76 are operated. A limit by-pass switch 79 is also provided. Connections are made by way of suitable terminal blocks 81 and 82. The controller 33 is commercially available and an L–N SpeedoMax, Model H, performs the necessary comparison and control steps satisfactorily.

Figure 6:
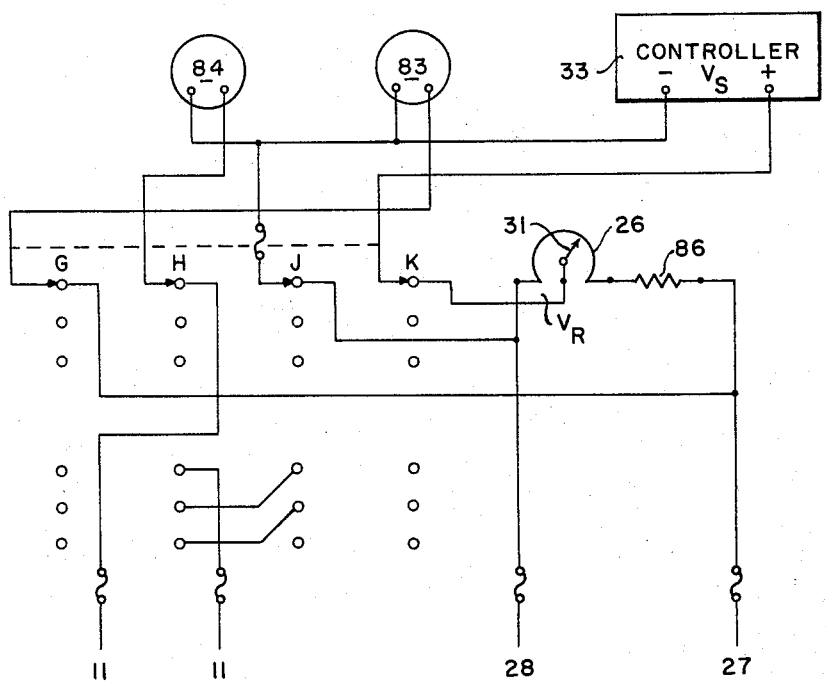
FIGURE 6 is an electrical schematic illustrating the reference voltage and standard voltage comparison circuit.

As shown in FIGURE 6 the variable resistor 26 is connected in series between the anode probe 27 and cathode bus 28 at each pot 1–N. This voltage across the variable resistor 26 is equal to the voltage drop $V_W$ between the anode face and cathode. A portion $V_R$ of the voltage $V_W$ is brought out via the center tap 31 and one terminal of the variable resistor. This voltage $V_R$ is proportional to $V_W$, which is measured by a suitable voltmeter 83. A second voltmeter 84 measures the total voltage $V_W$ across each pot. All circuits are properly fused and a current limiting resistor 86 is connected in series with the variable resistor 26. Each pot 1–N is calibrated by opening the disconnect switch 36 or 38 and adjusting the variable resistor 26 until $V_R$ equals $V_S$ as indicated by the respective voltmeters, after $V_W$ is brought to the desired optimum value by manually controlling the anode position.

As shown in FIGURE 7, the raise and lower solenoids 24 are connected across contacts E and F at each step position 1–70 and disconnect switches 36 and 38. All circuits are properly fused and Off and Point signal lamps 87 and 88 are provided to indicate the operation taken at each step position. The Raise Solenoid 24 is energized upon actuation of Raise relay 62 and closure of contacts 62A. Energization of Lower relay 63 closes contacts 63A to energize the lower solenoid 24 to operate the valve 23 and lower the anode 12.

Although a preferred embodiment of the invention has been described in detail, it is apparent that various changes, modifications and alterations may be made without departing from the spirit and scope of the invention which is to be limited only by the appended claims.

What is claimed is:

1. The process of calibrating the working voltage of a plurality of aluminum reduction pots, each having a relatively movable anode and cathode, and each of which may have different operating characteristics and determined but different working voltages for optimum operation comprising the steps of: adjusting said relatively movable anode and cathode of each of said pots until each of said working voltages equals said determined value for each of said pots; producing a variable reference signal proportional to each of said working voltages; and calibrating each of said variable reference signals with a single standard signal.

2. The method of controlling the working voltage of a plurality of aluminum reduction pots, each pot having a relatively movable and spaced anode and cathode, and a determined optimum working voltage variable in response to variations in spacing between said anode and cathode and changes in alumina concentration in said pot during electrolysis comprising the steps of: producing a reference signal proportional to said determined optimum working voltage of each of said pots; calibrating each of said reference signals with a single standard signal; sequentially and periodically comparing each of said reference signals with said single standard signal; and adjusting said anode relative to said cathode in each of said respective pots in response to variations between said reference signals and said standard signal to balance each of said reference signals with said standard signal, thereby controlling the working voltage of each of said reduction pots.

3. The method of claim 2 wherein said anode is adjusted relative to said cathode only when said variation between said reference voltage and said standard voltage is outside a determined control range.

4. In combination with a plurality of aluminum reduction pots for the electrolytic reduction of alumina, each having a spaced relatively movable anode and cathode between which an electrolyzing current is passed and a resulting pot working voltage is developed, means for controlling said working voltage comprising: circuit means including a variable resistance in shunt across said anode and cathode of each pot to produce a variable reference signal proportional to said working voltage; means providing a single standard signal for all the pots; and means for periodically comparing and balancing each said reference signal with said standard signal.

5. In a system for maintaining a substantially constant working voltage between the spaced operative surfaces of a relatively movable anode and cathode of each of a plurality of aluminum reduction pots by varying the distance between each said anode and cathode as electrolysis takes place, the improvement comprising circuit means including resistance means in parallel with said anode-cathode current path of each pot producing a reference voltage $V_R$ proportional to said working voltage; control means common to all the pots producing a single standard voltage $V_S$; means for comparing each said reference voltage $V_R$ with said standard voltage $V_S$; and drive means responsive to variations between $V_R$ and $V_S$ for effecting a control action in each cell by adjusting its anode-cathode spacing.

6. Apparatus as defined in claim 5 wherein said control means includes means for preventing said drive means from effecting said control action until $V_R$ varies outside of a determined control range.

7. Apparatus as defined in claim 5 including timer means for preventing said control action from being effected until $V_R$ varies from $V_S$ outside of said control range for a determined interval, thereby preventing adjustment of said anode relative to said cathode upon spurious variations of $V_R$ outside of said control range.

8. A system for controlling the working voltage $V_W$ of a plurality of aluminum reduction pots, each of said pots having a spaced and relatively movable anode and cathode between which an electrolyzing current is passed resulting in a voltage drop $V_W$ therebetween, comprising: circuit means including variable resistance means connected to said anode and cathode of each of said pots, adapted to produce a voltage $V_R$ across said variable resistance means proportional to said working voltage $V_W$ and equal to a predetermined standard value; control means providing a single standard voltage $V_S$ corresponding to said standard value; scanning means for periodically applying said voltages $V_R$ in seriation to said control means to compare each of said voltages $V_R$ with said standard voltage $V_S$; and drive means for each of said reduction pots responsive to said control means and variation between said reference voltage $V_R$ and said standard voltage $V_S$ for effecting a control action and varying the spacing between said anode and said cathode of each of said respective pots to balance each of said respective voltages $V_R$ and $V_S$.

9. Apparatus as defined in claim 8 including means for comparing and balancing the reference voltage $V_R$ and the standard voltage $V_S$ at determined intervals.

10. In a system for maintaining the working voltage of a plurality of aluminum reduction pots substantially constant, said working voltage being the voltage drop between the spaced and relatively movable anode and cathode of each of said respective pots, and resulting from passing an electrolyzing current through an aluminum-bearing salt between said anode and cathode, and in which the working voltage is maintained substantially constant by varying the spacing between said anode and cathode of said respective pots during electrolysis, the improvement comprising circuit means including variable resistance means in parallel with the anode to cathode current path of each of said pots, each of said variable resistance means being adjusted to provide a voltage $V_R$ thereacross proportional to the corresponding pot working voltage $V_W$, each said voltage $V_R$ being equal to a standard value when the pots are respectively adjusted to a predetermined anode-cathode spacing; control means common to said pots producing a single standard voltage $V_S$ equal to said standard value; scanning means for selecting and applying each of said voltages $V_R$ in seriation to said control means to compare said voltages $V_R$ with said standard voltage $V_S$ in seriation; and drive means selectively responsive to differences between each reference voltage and said standard voltage $V_S$ as determined by said control means for effecting a control action by varying the spacing between said anode and cathode to balance said reference voltage $V_R$ and said standard voltage $V_S$.

11. Apparatus as defined in claim 8 wherein said control means includes a first timing means for advancing said scanning means to the next succeeding reference voltage $V_R$ in the event that upon the selection of one of said reference voltages $V_R$ by said scanning means no control action is commenced by said drive means during an initial comparison interval as determined by said first timing means.

12. Apparatus as defined in claim 8, wherein said control means includes means for preventing said drive means from effecting said control action until $V_R$ varies outside of a determined control range.

13. Apparatus as defined in claim 12 including timer means for preventing said control action from being effected until $V_R$ varies from $V_S$ outside of said control range for a determined interval, thereby preventing adjustment of said anode relative to said cathode upon spurious variations of $V_R$ outside of said control range.

14. Apparatus as defined in claim 11 wherein said control means includes second timing means for extending said initial comparison interval to a determined maximum comparison interval in the event a control action is commenced but not effected by said drive means during said initial comparison interval.

15. Apparatus as defined in claim 14 wherein said second timing means includes further means for advancing said scanning means to the next succeeding reference voltage in the event that the control action is not effected during said maximum comparison interval.

16. Apparatus as defined in claim 15 wherein said control means includes signal means for indicating when a control action is commenced but not effected during said maximum comparison interval; and switch means responsive to said condition for disconnecting said respective reduction pot from said control means.

17. Apparatus as defined in claim 8 wherein said drive means comprises reversible motor means operatively connected to each anode for raising and lowering said anode relative to said cathode; a source of power for said reversible motor means; reversible means responsive to said control means for reversibly connecting said source of power to said reversible motor means, said reversing means including a switch for disconnecting said control means and said source of power from said reversible motor means; and manually operable means for reversibly connecting said source of power to said reversible motor means.

18. Apparatus as defined in claim 17 including signal means for indicating the direction in which said reversible motor means adjusts said anode relative to said cathode.

19. Apparatus as defined in claim 8 wherein said reduction pots are connected in series with a suitable source of line current and said control means including line current responsive means for disconnecting said control means when said line current is not within a determined range.

20. Apparatus as claimed in claim 8 wherein said scanning means comprises a multi-position stepping switch, one stepping switch position for each reduction pot to be controlled; said stepping switch including homing means for selectively advancing said stepping switch over said positions to a selected switch position as determined by said homing means.

21. The method of operating a plurality of aluminum reduction pots, each having a relatively movable anode and cathode, comprising the steps of: producing for each pot a reference signal $V_R$ proportional to a selected operating parameter which is responsive to changes in the pot anode-cathode spacing, each reference signal being calibrated to a single standard signal $V_S$ for all the pots; and periodically comparing the reference voltage $_R$ of each pot to said standard voltage $V_S$ and adjusting the anode-cathode spacing thereof to balance said signals.

22. The method of claim 21, including the steps of adjusting each pot to a predetermined condition corresponding to an optimum value of said operating parameter, and calibrating the resulting reference signals to said standard signal.

References Cited
UNITED STATES PATENTS

| | | | |
|---|---|---|---|
| 2,904,490 | 9/1959 | Hanssen | 204—228 X |
| 2,918,421 | 12/1959 | Lundborg | 204—228 X |
| 2,930,746 | 3/1960 | Cooper | 204— 228 X |

FOREIGN PATENTS

| | | |
|---|---|---|
| 554,277 | 6/1943 | Great Britain. |
| 649,175 | 1/1951 | Great Britain. |

JOHN H. MACK, *Primary Examiner.*

G. KAPLAN, *Assistant Examiner.*